United States Patent [19]

Yoshinaga

[11] Patent Number: 4,804,324
[45] Date of Patent: Feb. 14, 1989

[54] BURNER DEVICE

[75] Inventor: Sadao Yoshinaga, Ichikawa, Japan

[73] Assignee: Prince Industrial Development Co., Ltd., Tokyo, Japan

[21] Appl. No.: 894,797

[22] Filed: Aug. 8, 1986

[30] Foreign Application Priority Data

Aug. 12, 1985 [JP] Japan .................... 60-123630[U]

[51] Int. Cl.⁴ .................................................. F23Q 7/10
[52] U.S. Cl. ................................. 431/255; 431/344; 431/354; 251/288; 251/903; 403/316
[58] Field of Search ............... 431/255, 344, 354, 355; 851/205, 274, 288, DIG. 4; 403/316, 317, 341

[56] References Cited

U.S. PATENT DOCUMENTS

| 1,182,288 | 5/1916 | Mack | 403/341 X |
|---|---|---|---|
| 2,862,993 | 12/1958 | Schmidt | 403/341 |
| 2,942,897 | 6/1960 | Eason | 403/317 |
| 4,526,532 | 7/1985 | Nelson | 431/255 |
| 4,538,984 | 9/1985 | Nakagawa | 431/255 |
| 4,545,759 | 10/1985 | Giles et al. | 431/344 |
| 4,601,310 | 7/1986 | Phillips | 251/903 X |

FOREIGN PATENT DOCUMENTS

| 1282376 | 11/1968 | Fed. Rep. of Germany | 251/274 |
|---|---|---|---|
| 2824548 | 12/1979 | Fed. Rep. of Germany | 431/344 |
| 2269683 | 11/1976 | France | 431/344 |

Primary Examiner—Samuel Scott
Assistant Examiner—Allen J. Flanigan
Attorney, Agent, or Firm—Weingarten, Schurgin, Gagnebin & Hayes

[57] ABSTRACT

In this invention, two connecting devices are provided in a burner device to accommodate liquefied gas cylinders/fuel tanks having different mounting cap configurations. The invention also includes a piezoelectric ignition device as part of the burner device for igniting gas provided by the liquefied gas cylinder/fuel tank.

5 Claims, 4 Drawing Sheets

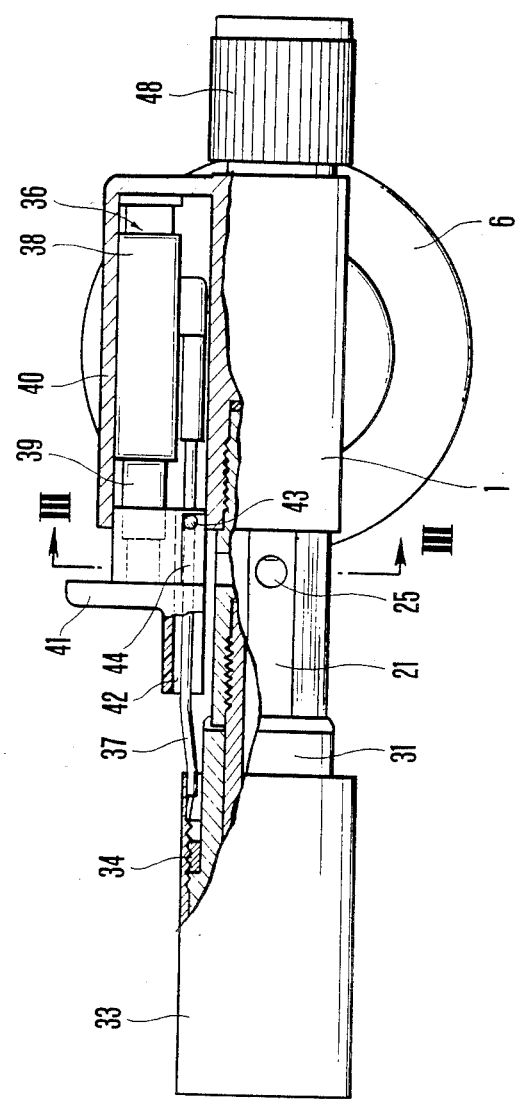
F I G. 2

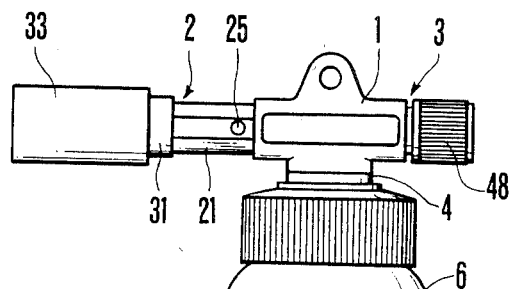
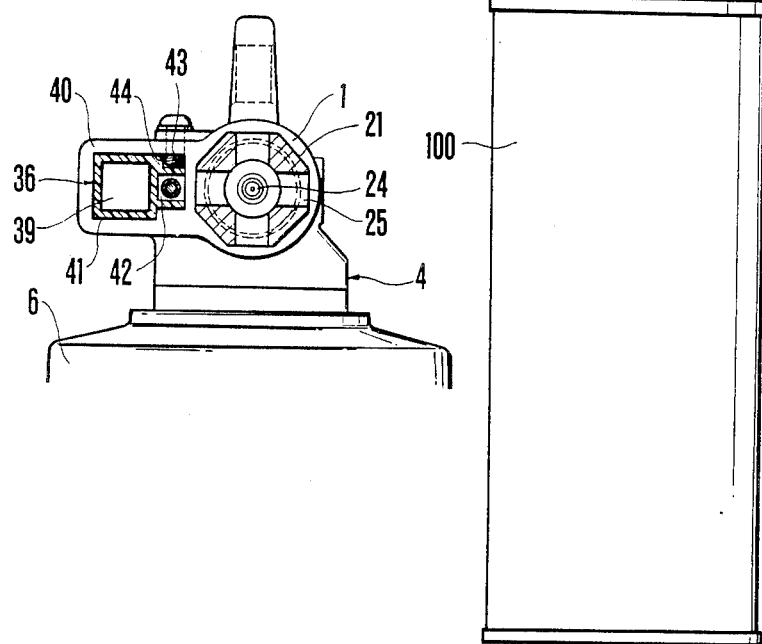
FIG.4
FIG.3

BURNER DEVICE

FIELD OF THE INVENTION

This invention relates to a compact burner device for use in welding, cutting and other types of metalworking.

BACKGROUND OF THE INVENTION

Conventional burner devices include a connecting member which engages the liquefied gas cylinder/fuel tank by pinching the periphery of the liquefied gas cylinder/fuel tank. This type of connecting member is limited to use with particular liquefied gas cylinders/fuel tanks and is generally not usable with commercially available portable liquefied gas cylinders.

SUMMARY OF THE INVENTION

This invention was devised to solve the problem described above. The object of this invention is to provide a burner device having two connecting means which permit the burner device to use liquefied gas cylinders/fuel tanks having a variety of mounting cap configurations. One or both connecting means may be used to connect the burner device with a liquefied gas cylinder and when both connecting means are used, a more secure connection is ensured.

The burner device of the present invention comprises a burner body having a nozzle device, a valve device and an integrally formed cylindrical connecting portion. A connecting member is installed in the connecting portion and includes a lower portion protruding outwardly from the connecting portion. The lower portion forms an intake opening in which is disposed an outwardly protruding injection stem.

A cap-shaped holder is disposed about the periphery of the lower portion and includes a circumferential wall having an inwardly depending protrusion. A rotatable clamping member is threaded on the outer surface of the connecting member to be disposed outwardly of the holder.

The configuration of the burner device according to the present invention includes an igniter for igniting a gas flowing therethrough.

The igniter of this invention is a piezoelectric ignition device which is disposed in a casing formed on one side of the burner body. The piezoelectric ignition device is configured to ignite the discharged gas at the exit end of the nozzle device.

The invention will be described in detail according to embodiments shown in drawings.

BRIEF DESCRIPTION OF THE DRAWINGS

Drawings indicate embodiments of a burner device according to the present invention.

FIG. 2 is a partial sectional view of the burner device of FIG. 1;

FIG. 3 is a cross sectional view of the burner device of FIG. 2 taken along line III—III;

FIG. 4 is a plan view of the burner device secured to a liquefied gas bomb.

DETAILED DESCRIPTION OF THE INVENTION

Figure 1:
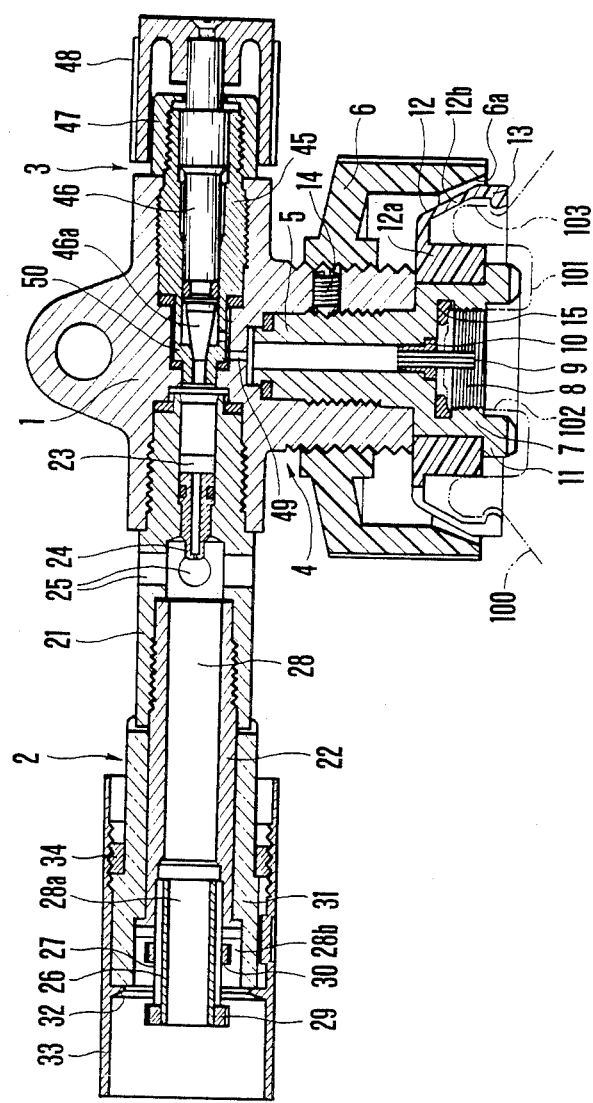
FIG. 1 is a cross sectional view of a burner device according to the present invention.

The drawings illustrate a burner device according to the present invention for use in combination with a liquefied gas cylinder or tank 100. The liquefied gas cylinder 100 includes a mounting cap 101 having a periphery 103 and a closed, protruding central portion 102.

The burner device includes a body 1 having a nozzle device 2 and a valve device 3 for controlling gas flow threaded thereinto. A cylindrical connecting portion 4 is integrally formed as part of the body 1, as shown in FIG. 1.

Threads are provided on the inner and outer surfaces of the connecting portion 4. A connecting member 5 having an externally threaded end is threaded into the inner threaded surface of the connecting portion 4. A cap-shaped clamping member 6 having an internally threaded surface is threaded to the outer threaded surface of the connecting portion 4.

The connecting member 5 is a hollow body having a lower portion 7 protruding outwardly from the connecting portion 4 which forms an intake opening 7a having a larger diameter than the connecting portion 4. The intake opening 7a has a threaded surface 8. The inner diameter of the intake opening 7a is slightly larger than the outer diameter of the closed, protruding central portion 102 of the liquefied gas cylinder 100. An injection stem 9 engaged in a sleeve 10 is mounted in the hollow body of the conncting member 5 to protrude through the closed, protruding central portion 102 of the liquefied gas cylinder 100.

The external end of the lower portion 7 is formed as a flange 11. A cap-shaped holder 12 having a mid-portion 12a and a peripheral wall 12b is combined with the connecting portion 4 by fitting the mid-portion 12a between the flange 11 and the lower end of the connecting member 5. The mid-portion 12a is block shaped in cross-section and has a diameter approximately equal to the inner diameter of the periphery 103 of the mounting cap 101.

A inwardly-extending protrusion 13 is integrally formed at the external end of the periphery wall 12b. The protrusion 13 engages the periphery 103 of the liquefied gas cylinder 100. The inner diameter of the periphery wall 12b may be decreased by providing a plurality of divided grooves on the inner surface thereof.

The clamping member 6 is sized to contain the cap-shaped holder 12 and is provided with a tapered surface 6a as shown in FIG. 1. The tapered surface 6a presses against the periphery wall 12b to urge the protrusion 13 into engagement with the periphery 103 of the liquefied gas cylinder 100.

A stop screw 14 is provided as shown in FIG. 1. A packing material 15 is also provided in the intake opening 7a as shown in FIG. 1.

The nozzle device 2 includes a nozzle base pipe 21 threaded into the burner body 1 and a nozzle tube 22 threaded into the nozzle base pipe 21. A spray nozzle 24 and a filter 23 are disposed in the nozzle pipe 21. Air intake holes 25 are formed through the nozzle base pipe 21 downstream from the filter 23.

A cylindrical nozzle head 26 which forms a burner is provided at the exit end of the nozzle tube 22. A plurality of spline grooves 27 are formed about the periphery of the nozzle head 26. One end of the nozzle head 26 is inserted into opening at the exit end of the nozzle tube 22. A flow passage 28 through the nozzle tube 22 is divided by the nozzle head 26 into two passages, a main passage 28a and a sub-passage 28b.

Ring members 29, 30 are inserted at the exit end of the nozzle head 26 about the periphery thereof, respectively. The ring member 29 is fixed and serves as an electrode while the ring member 30 is movable and operates as a resistant body to control the flow of gas.

Figure 5:
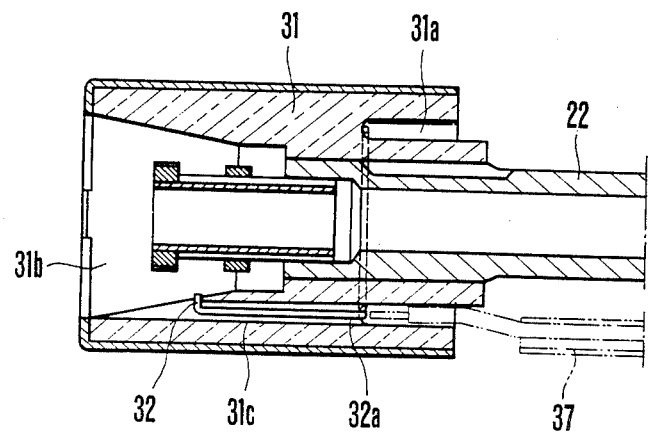
FIG. 5 is a cross sectional view of another embodiment of a nozzle device.

An insulating cylinder 31 is secured to the periphery of nozzle tube 22 as shown in the embodiments of FIGS. 1 and 5. The insulating cylinder 31 surrounds the sub-passage 28b and operates as an electrode stand. The insulating cylinder 31 is formed from a ceramic material and includes a step portion and a groove.

A burner cover 33 is disposed about the insulating cylinder 31 as shown. Referring to FIG. 1, a nut 34 is inserted in the groove between the burner cover 33 and the insulating cylinder 31 to act as a rotational stop and retainer for the burner cover 33. The burner cover 33 of FIG. 1 also includes a protruding discharge electrode 32 which acts as a latching member by engaging the step portion of the internal cylinder 31. The burner cover 33 is connected to a lead wire 37 of a piezoelectric ignition device 36 provided on the body 1 as shown in FIG. 2.

The connection between the lead wire 37 and the burner cover 33 can be easily achieved by inserting the end portion of the lead wire 37 into the clearance between the insulating cylinder 31 and the burner cover 33. The end portion of the lead wire 37 is then connected to the burner cover 33.

In the embodiment shown in FIG. 5 the insulating cylinder 31 includes a coaxially formed recess 31a. The insulating cylinder 31 of FIG. 5 also includes a hole 31c extending into the recess 31a and forming an opening 31b at the external end of the insulating cylinder 31.

A metal wire 32a, one end of which acts as the electrode 32, is inserted into the recess 31a and the hole 31c. The end portion of the lead wire 37 is inserted into the recess 31a to engage the metal wire 32a.

As shown in FIG. 2, the piezoelectric ignition device 36 comprises a fixed member 38 containing a piezoelectric element and an impact spring and a movable member 39 inserted into said fixed member 38. The movable member 39 is urged outwardly by the impact spring in a manner similar to piezoelectric ignition devices used in gas lighters or the like. The piezoelectric ignition device 36 is housed in a casing 40 integrally formed on the body 1.

Referring to FIG. 3, the piezoelectric ignition device 36 includes an operating device 41 which slides along the inside of the casing 40. The operating device 41 includes a housing groove 42 for the lead wire 37 and a surface groove 44. A retaining screw 43 is disposed in the surface groove 44 to prevent the operating device 41 from sliding out of the casing 40 in the direction of motion of the movable member 39.

Figure 6:
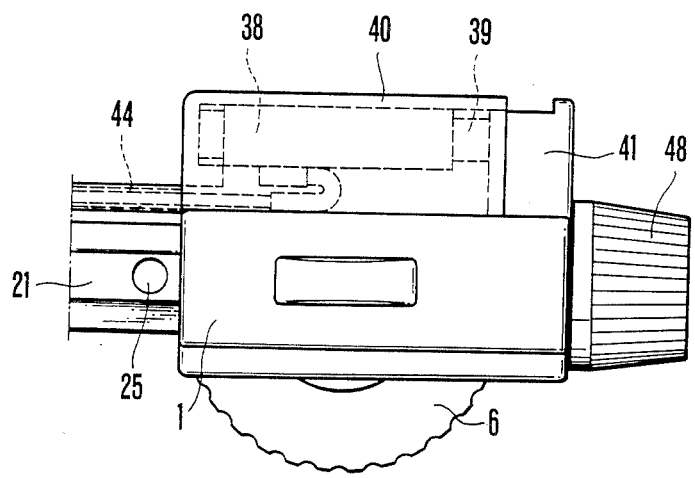
FIG. 6 is a partial plan view showing another embodiment of a piezoelectric ignition device.

FIG. 6 illustrates an embodiment wherein the piezoelectric ignition device 36 is contained in the casing 40 with the fixed member 38, the movable member 39 and the operating device 41 in reversed orientation from the embodiment of FIG. 3. Since the operating device 41 protrudes towards the valve device 3, the housing groove to contain the lead wire 37 is unnecessary. Further, since the operating device 41 contacts an end face of a valve operating device as described hereafter, the retaining screw is also unnecessary.

As shown in FIG. 1, the valve device 3 includes a cylinder 45 into the body 1 and a valve operating device 48. The valve operating device 48 includes a needle valve 46 having an end 46a disposed in the cylinder 45 and a stopper member 47, integrally formed with the needle valve 46, threaded onto the cylinder 45 as shown.

A valve seat 50 is formed at the internal end of the cylinder 45. The valve seat 50 communicates with a gas passage 49 formed in the body 1 and the nozzle device 2.

To connect the burner device to the liquefied gas cylinder 100, the lower portion 7 and mid-portion 12a are inserted within the periphery 103 by rotating the clamping member 6 towards the liquefied gas cylinder 100. This movement causes the peripheral wall 12b to be pressed against the periphery 103 such that the protrusion 13 engages the periphery 103.

If the liquefied gas cylinder 100 has an externally threaded closed, protruding central portion 102, the central portion 102 is first threaded into the threaded surface 8 of the intake opening 7a. The holder 12 is then engaged with the clamping member 6 by rotating the clamping member 6 as described above.

By this connection, the closed, protruding central portion 102 of the cylinder 100 is pushed open by the injection stem 9. With the needle valve 46 in the open position, gas flows out of the liquefied gas cylinder 100 and through the connecting member 5, passage 49, valve seat 50, filter 23 and spray nozzle 24 into the passage 28 in the nozzle pipe 21. Intake air from the air intake holes 25 is mixed with the gas flow and the mixture flows outwardly through the main passage 28a and the sub-passage 28b.

Operation of the piezoelectric ignition device 36 generates a discharge spark between the discharge electrode 32 and the ring member 29 which ignites the mixture flowing through the sub-passage 28b.

Accordingly, the configuration of the burner device according to the present invention includes two means for connecting the burner device to a liquefied gas cylinder. The first means is the threaded surface of the intake opening and the second means is the cap-shaped member in combination with the cap-shaped clamping member as described hereinabove. Since either or both means may be used to connect a liquefied gas cylinder to the burner device, the burner device of the present invention can advantageously be used with commercially available gas cylinders.

Since the present invention includes a piezoelectric ignition device, there is no necessity to provide another ignition device. Furthermore, since ignition is accomplished by igniting the small gas flow through the sub-passage which subsequently ignites the large gas flow of the main passage, ignition is reliably achieved even with limited ignition energy. And since ignition occurs at the external end of the cylindrical nozzle head, there is no danger of electrical shock during ignition.

What is claimed is:

1. A burner device comprising:
   a burner body including a nozzle device at the front, a valve device at the rear thereof and a cylindrical connecting portion integrally formed at the lower side thereof;
   a connecting member installed in said connecting portion to form a lower portion protruding from said connecting portion as an intake opening;

an injection stem inserted in said intake opening to protrude downwardly therefrom;

a cap-shaped holder having a ringlike portion capable of resiliently decreasing in diameter inserted around said lower portion and provided with a protrusion for latching with a fuel tank; and a rotatable cap-shaped clamping member threaded to the outer periphery of said cylindrical connecting portion wherein said rotatable cap-shaped clamping member is located at the outer side of said cap-shaped holder, wherein said rotatable cap-shaped clamping member interacts with said cap-shaped holder such that, when said rotatable cap-shaped clamping member is rotated toward the fuel tank, said rotatable cap-shaped clamping member urges said protrusion of said cap-shaped member into a corresponding recess in the fuel tank upon which the burner is to be mounted.

2. The burner device of claim 1, further comprising a piezoelectric ignition device provided at the side of the burner body, said nozzle device including a nozzle tube having a flow passage formed therethrough and forming a burner at the exit end of said nozzle tube, said burner including
- a pipe-shaped nozzle head which forms separately a main passage and a sub-passage from said flow passage of said nozzle tube,
- an insulating cylinder mounted on said nozzle tube which serves as an electrode stand which surrounds said sub-passage, and
- a discharge electrode at the side of said insulating cylinder connected with a lead wire of said piezoelectric ignition device.

3. The burner device according to claim 2 wherein said piezoelectric ignition device is horizontally disposed in a casing integrally formed with said burner body.

4. A burner device comprising:

a burner body having a cylindrical connecting portion at the lower side thereof, a nozzle device threaded into the front portion of said burner body, a valve device threaded into the rear portion of said burner body and a piezoelectric ignition device provided at the side of said burner body;

said nozzle device including a nozzle tube having a flow passage formed therethrough and forming a burner at the exit end of said nozzle tube, said burner including
- a pipe-shaped nozzle head which forms separately a main passage and a sub-passage from said flow passage of said nozzle tube,
- an insulating cylinder mounted on said nozzle tube which serves as an electrode stand which surrounds said sub-passage, and
- a discharge electrode at the side of said insulating cylinder connected with a lead wire of said piezoelectric ignition device; and wherein said valve device includes
- a cylinder threaded into the rear portion of said burner body,
- a needle valve inserted into said cylinder,
- a stopper member integral with said needle valve and threaded onto the rear portion of said cylinder, and
- a valve operating device covering said stopper member, the inner end of said cylinder forming a valve seat into which the end of said needle valve is inserted.

5. The burner device according to claim 4, further comprising a nozzle device having a nozzle base pipe threaded into said burner body, said nozzle base pipe having a filter disposed therein and a spray nozzle installed in contact with said filter therein and further wherein said nozzle base pipe has at least one air intake hole formed downstream of said filter.

* * * * *